March 23, 1965     H. O. SELTSAM     3,174,212
METHOD OF MAKING AN INVERTED VALVE
Filed July 27, 1960
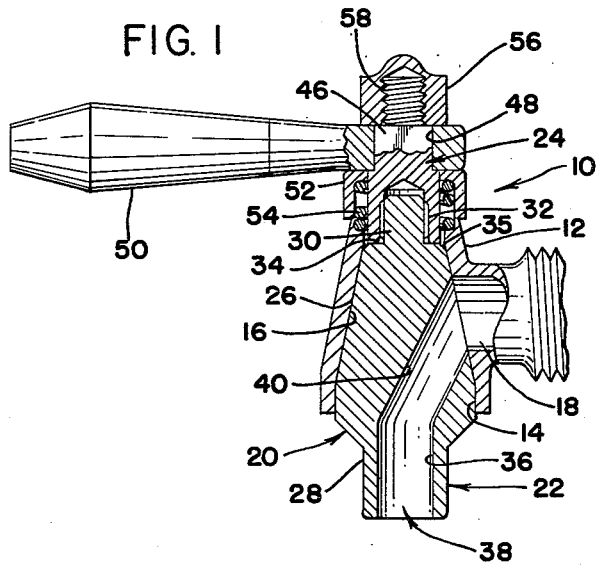
FIG. 1
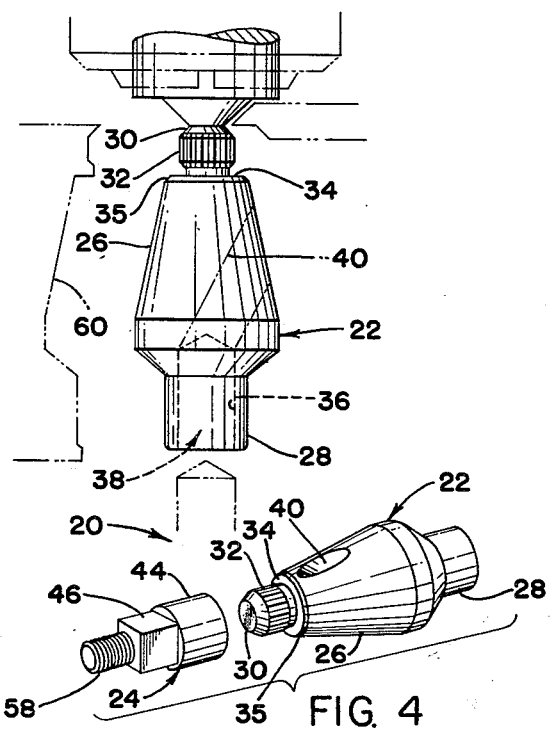
FIG. 2
FIG. 4
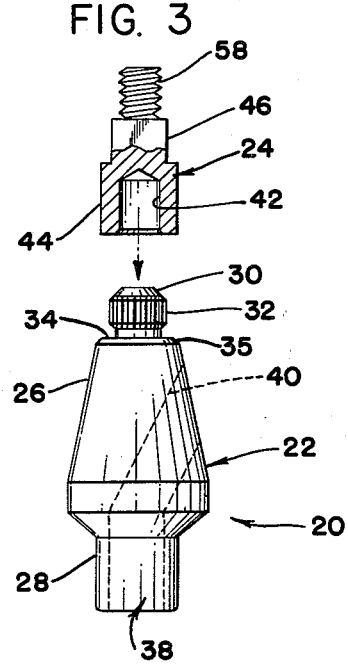
FIG. 3
INVENTOR.
HAROLD O. SELTSAM
BY
*Fay & Fay*
ATTORNEYS United States Patent Office 3,174,212
Patented Mar. 23, 1965

3,174,212
METHOD OF MAKING AN INVERTED VALVE
Harold O. Seltsam, Rocky River, Ohio, assignor to Tomlinson Industries, Inc., Cleveland, Ohio, a corporation of Ohio
Filed July 27, 1960, Ser. No. 45,603
5 Claims. (Cl. 29—157.1)

This invention, as indicated, relates to valves of the so-called "inverted type" and to an improved method for constructing particularly the valve plug assembly forming a component of the valves. Valves of the type here involved have found particularly useful application in connection with the dispensing of liquid foods, such as coffee, tea, and the like.

Heretofore, a common objection to liquid food dispensing valves has been grounded on the fact that many such valves were difficult or impossible to disassemble for cleaning without the use of tools, thereby rendering on-the-spot maintenance extremely inconvenient. Further, the methods contemplated for the manufacture of such valves have not been completely satisfactory because of the tendency of such methods to produce valves with unacceptable fluid sealing properties and/or with crevices, cracks, and corners having a tendency to trap liquid foods and render the valves unsanitary. In addition, the problems attendant to the machining of certain of the components of such valves have been serious when previously known methods were used.

It is, therefore, a general object of the invention to provide a valve assembly which may be disassembled for cleaning without the use of tools. It is a further object of this invention to provide an improved method for the efficient and inexpensive production of a valve plug assembly.

It is a further object of this invention to provide a method of the type described which contemplates the production of a valve plug assembly in two parts which are subsequently force-fitted together to produce thereby an elongated, unitary assembly.

It is a further object of this invention to provide a method of the type described which avoids hitherto attendant problems in machining an elongated valve plug assembly with an external taper.

It is a still further object of the invention to provide a sanitary ground plug faucet which has no corners, or crevices to trap liquid foods.

Other and further objects of the invention will be apparent from the detailed description to follow. In the drawings:

FIG. 1 is a side elevation, partly in section, of a valve employing a valve plug assembly made in accordance with the teachings of the invention;

FIG. 2 is a side elevation of the plug component of a valve plug assembly, showing in phantom portions of a tool which may be employed to carry out part of the method;

FIG. 3 is an exploded view showing the valve plug and stem components just prior to the driving or pressing operation, and FIG. 4 is an exploded perspective view in reduced scale of the components shown in FIG. 3.

*The valve assembly*

Referring now more specifically to the drawing, there is shown in FIG. 1 a valve of the type in which a valve plug assembly, produced according to the instant method, is utilized. The valve, indicated generally at 10, includes a housing or body 12 provided with a central bore 14. As will be observed, the intermediate portion of the bore 14 is flared as at 16. An inlet 18 communicates with the flared portion 16 of the bore 14. Snugly received within the bore 14 of the body or housing 12 is a valve plug assembly indicated generally at 20.

The valve plug assembly 20 includes a plug component 22 and a stem component 24. An intermediate portion of the exterior surface of the plug component 22 is provided with a tapered or frusto-conical surface 26 which is complementary to the surface 16 provided in the bore 14 of the housing 12. Both the surface 16 of the body or housing 12 and the surface 26 of the plug component 22 are formed on an included angle of not less than 25 degrees, nor more than 27 degrees.

The lower end of the plug component 22, as viewed in FIG. 1, is provided with a necked or stepped external surface as seen at 28. The upper end of the plug component 22, as viewed in FIG. 1, is provided with a coaxial nipple 30 having longitudinally extending serrations 32 formed on its external surface. The nipple 30 is joined to the remainder of the plug component by means of a radial shoulder 34. The radial shoulder 34 is joined to the frusto-conical surface 26 by means of a radius or bevel as at 35. This prevents the flared portion 16 of the central bore 14 of the housing from being scored when the valve plug assembly is inserted therein. Obviously, such scoring would be extremely undesirable since it would interfere with the metal-to-metal seal between the housing and the valve plug.

A fluid conducting bore or passageway 36 is provided in the plug component 22, and as will be observed, is, over the lower portion thereof, coaxial with the axis of the plug to form an outlet 38. The upper portion 40 of the bore or passageway 36, as viewed in FIG. 1, extends at an angle of about 27 degrees with respect to the longitudinal axis of the plug 22 and joins both the outlet portion 38 of the bore 36 and the frusto-conical surface 26 of the plug. As will be observed, the upper portion 40 of the bore 36 joins the frusto-conical surface 26 of the plug at a position on the level of the inlet 18 so that upon proper rotational orientation of the plug the upper portion 40 of the bore 36 will be aligned with the inlet to allow fluid to pass completely through the valve. Is is important that the portions 38 and 40 join one another on a smoothly curving surface as seen in the drawings, in order that no cracks, crevices, or corners be presented to accumulate material passing through the valve or to interfere in any way with flow.

The stem component 24 of the valve plug assembly is provided with an axially extending bore 42 having a diameter somewhat smaller than the diameter of the nipple 30 around the serrations 32. Because of this relationship, the stem 24 may be force-fitted or pressed onto the nipple 30 of the plug thereby to provide a unitary valve plug assembly.

The external diameter of the stem 24 at the portion 44 thereof adjacent the plug 22 is of a diameter about equal to the diameter of the frusto-conical surface 26 at the smaller diameter terminus thereof. Provided intermediate the ends of the stem 24 is a polygonal surface 46 illustrated in the drawings as being rectangular in cross section. This intermediate portion 46 of the stem 24 is non-rotatably received within a cooperating aperture 48 provided in the handle 50. In this manner rotational movements of the handle about the axis of the valve may be imparted to the valve plug assembly.

A spring cover 52 is received over the cylindrical portion 44 of the stem 24 between the handle 50 and the body or housing 12. A suitable compression spring 54 seats at one end upon the spring cover 52 and at the other end upon the housing or body 12. The spring 54 is carefully selected to hold the valve plug assembly 20 within the housing with the proper amount of biasing force.

If the spring is too strong, the central bore 14 becomes scored, and if it is too weak a metal-to-metal seal is not effected between the housing and plug assembly, and leakage results. A suitable nut 56 is removably engaged with screw threads 58 provided upon the end of the stem 24 opposite the bore 42.

The method

In the practice of the method for making the valve assembly, it will be realized that a considerable variation both in the number and sequence of operations performed may occur, depending upon the particular machines which are employed in carrying out the steps. The housing or body 12 is produced in a more or less conventional manner which contemplates imparting to the body its preliminary form by casting or by usual screw machining operations, if desired. Subsequently, the body is polished, buffed and color buffed, after which the frusto-conical surface 16 is turned by means of a precision boring machine. After removal of burrs at the juncture of the inlet 18 and the central bore 14, the surface 16 is lapped to provide, when the plug assembly is received therein, a metal-to-metal fluid sealing interface.

Particularly important is the method by which the plug assembly is produced. According to a proven procedure, the plug component may be manufactured from bar stock using a conventional screw machine. Normally, the first step in the procedure is to rough the outside shape of the plug, using a suitable formed cutter such as that shown in phantom at 60 in FIG. 2. Concurrently with the roughing operation the portion 38 of the fluid conducting bore or passage is drilled. Usually in the complete drilling operation several drills are employed, starting with a center drill and gradually enlarging the bore thus formed through the use of additional drills of progressively increased size.

Subsequently, after the completion of the roughing operation a suitable shaving tool is employed to smooth the outside surface of the plug. Here again a tool of the formed variety has been found to produce very favorable results. The corner break or bevel 35 may also be provided at this stage, if desired. The serrations 32 are then rolled into the nipple portion 30 by means of a suitable tool and a cut-off is next employed to separate the partially completed plug from the bar.

Following the cut-off operation, the angularly extending portion 40 of the fluid passageway 36 is drilled and then deburred with a suitable hand grinding tool to provide a smooth bore surface. Subsequently, the plug may be sand blasted to provide a smooth finish.

When the sand blasting operation has been completed, the frusto-conical surface 26 of the plug is turned on a precision boring machine. At the completion of this operation the frusto-conical surface 26 of the plug has a surface finish of about 30 micro inches to provide proper sealing characteristics when the valve plug assembly is seated within the housing or body.

After the surface 26 has been turned on the boring machine that portion of the plug 20 not confined within the body 12 is polished and buffed, and the entire plug is then chrome plated.

Because of the fact that the plating operation usually deposits the plating material in a layer or coating of uneven thickness leaving the piece out of round, it is necessary to perform a lapping operation on the frusto-conical surface 26 of the plug 20 to provide a uniform thickness of plating material. To insure a proper fluid tight seal between the plug and the body, these components are lapped within one another i.e., the surfaces to be lapped are coated with lapping compound and the the plug is fitted within the body after which relative rotation and reciprocation is imparted until the desired surface finish on each surface is obtained. The radius or bevel 35 is important to the success of the lapping operation because it prevents the scoring of the surface 16 as the parts are moved relative to one another.

The stem component 24 of the valve plug assembly may be efficiently produced from bar stock by using an automatic screw machine or the like.

A formed cutter has been found here also to be particularly effective in performing certain of the operations upon the stem 24. Through the use of such a formed cutter, the outside diameter of the stem at 44 and the outside diameter of the stem at the position where the threads 58 are subsequently to be provided, are machined at the same time. While the outside surface of the stem is being rough and finish machined, the bore 42 is formed by drilling.

The partially completed stem is then cut off and the thread 58 is subsequently formed by means of a die head or the like. At the same time the end of the thread is chamfered.

After the formation of the threads 58, the handle engaging means 46 are machined through the use of conventional milling equipment. Finally, the stem is finished by polishing, buffing, and plating techniques.

After the completion of the stem component 24 and the plug component 22, the serrated nipple portion 30 is force-fitted or pressed into the bore 42 to thereby unite these components into a unitary valve plug assembly. In a typical example the bore 42 would be a diameter of about 1.312 inches and the nipple 30 would be of a diameter of about 0.325–.002 inch over the serrations. In this way a tight locking fit between the nipple and the bore is insured.

While the invention has been for illustrative purposes described in connection with only a single embodiment, it will be immediately apparent to the skilled artisan that the method could be modified in a number of aspects insofar as sequence of operations atnd the tools which are used to perform these operations are concerned, without departing from the true spirit of the invention. It is therefore my desire to be limited only by the scope of the appended claims.

I claim:

1. A method of constructing an elongated valve plug assembly provided over an intermediate portion of its exterior surface with a coaxial frusto-conical configuration, and including the steps of (1) forming a first elongated piece of stock into a frusto-conical configuration having an elongated, reduced-diameter nipple coaxial therewith, disposed adjacent the smaller diameter terminus thereof, and interconnected with said configuration by means of a radially extending shoulder; (2) providing the stock with a first bore extending axially from the terminus opposite the nipple; (3) forming a bevel on said radially extending shoulder; (4) providing the nipple with a plurality of longitudinally extending serrations; (5) providing the stock with a second bore disposed at an angle to the axis of the first bore and in communication therewith; (6) providing a second elongated piece of stock with an axially extending bore of a size to lockingly fit over the serrations provided on the nipple of the first piece, and (7) force-fitting the nipple of the first piece into the bore of the second piece to provide thereby a unitary assembly.

2. A method of constructing a valve plug assembly comprising the steps of:
 (1) chucking a first elongated piece of bar stock for work to be performed thereon,
 (2) forming a first axially extending bore in one end portion of the bar stock,
 (3) forming a reduced nipple coaxial with the bore at a point spaced along the length of the stock remote from said one end portion,
 (4) forming a transverse shoulder where the nipple joins the bar stock,
 (5) providing a bevel on the periphery of the transverse shoulder,
 (6) forming a portion of the exterior of the stock with a frusto-conical surface coaxial with the bore and nipple converging toward the nipple and having the terminal portion thereof immediately adjacent the bevel, (7) forming friction means on the surface of the nipple, (8) severing the formed piece from the remainder of the bar stock, (9) providing the formed piece with a second bore disposed at an angle to the axis thereof joined at its inner end of the first bore and at its outer end to a portion of the frusto-conical surface,

(10) surface finishing the frusto-conical surface,

(11) providing one end portion of a second elongated piece of bar stock with an external diameter approximately the same as that of the terminal portion of the frusto-conical surface of the first piece,

(12) providing in said one end portion of the second piece an axially extending bore with a diameter to lockingly fit the nipple on the first piece,

(13) providing the other end portion of the second piece with substantially polygonal valve handle engaging means,

(14) driving the nipple of the first piece into the bore of the second piece to provide thereby a unitary valve plug assembly,

(15) inserting the valve plug assembly into the valve housing,

(16) lapping the valve plug in the housing by relative rotation to complete the finish on the frusto-conical surface.

3. A method of constructing a valve plug assembly comprising the steps of:
(1) securing a first elongated piece of bar stock having a predetermined diameter for work to be performed thereon,
(2) drilling a first axially extending bore in one end portion of the bar stock,
(3) simultaneous with the drilling of the first bore forming a reduced nipple coaxial with the bore at a point spaced along the length of the stock, a transverse shoulder where the nipple joins the stock and a frusto-conical surface on the exterior of the stock coaxial with the bore and nipple converging toward the nipple and having the terminal portion thereof immediately adjacent the transverse shoulder,
(4) providing a bevel on the transverse shoulder,
(5) forming friction means on the surface of the nipple,
(6) severing the formed piece from the remainder of the bar stock,
(7) providing the stock with a second bore disposed at an angle to the axis of the first bore and in communication therewith,
(8) surface finishing the frusto-conical surface,
(9) providing one end portion of a second elongated piece of bar stock having a diameter less than that of the first piece with an external diameter approximately the same as that of the terminal portion of the frusto-conical surface of the first piece,
(10) providing in said one end portion of the second piece an axially extending bore of a diameter to lockingly fit the nipple on the first piece,
(11) driving the nipple of the first piece into the bore of the second piece to provide thereby a unitary assembly,
(12) inserting the valve plug assembly into the valve housing and relatively rotating the assembly to provide a fluid tight seal between the assembly and the housing.

4. A method of constructing a valve plug assembly comprising the steps of:
(1) securing a first elongated piece of bar stock for work to be performed thereon,
(2) shaping the valve plug including forming a reduced nipple portion at one end, an axially extending bore at the other end and a frusto-conical surface coaxial with and intermediate of the bore and nipple,
(3) providing the surface of the nipple with frictional gripping means,
(4) severing the formed piece from the secured bar stock,
(5) providing the stock with a second bore disposed at an angle to the axis of the first bore and in communication therewith,
(6) surface finishing the formed piece,
(7) forming a stem having a bore of a diameter less than the diameter of the nipple,
(8) securing the stem to the formed plug by forcing the nipple into the bore of the stem,
(9) inserting the valve plug assembly into the valve housing and lapping the valve in the housing to provide a fluid tight seal between the valve plug and the housing.

5. A method of constructing a valve plug assembly comprising the steps of:
(1) securing a first elongated piece of bar stock for work to be performed thereon,
(2) drilling a first axially extending bore in one end portion of the bar stock,
(3) simultaneous with the drilling of the first bore forming a reduced nipple coaxial with the bore at a point spaced along the length of the stock, a transverse shoulder where the nipple joins the stock, and a frusto-conical surface on the exterior of the stock coaxial with the bore and nipple converging toward the nipple and having the terminal portion thereof immediately adjacent the shoulder,
(4) providing a bevel on the transverse shoulder,
(5) forming friction means on the surface of the nipple,
(6) severing the formed piece from the remainder of the bar stock,
(7) providing the stock with a second bore disposed at an angle to the axis of the first bore and in communication therewith,
(8) providing one end portion of a second elongated piece of bar stock with an external diameter approximately the same as that of the terminal portion of the frusto-conical surface of the first piece,
(9) simultaneous with the formation of the external diameter on the second piece providing in said one end portion of the second piece an axially extending bore of a diameter to lockingly fit the nipple on the first piece,
(10) driving the nipple of the first piece into the bore of the second piece to provide thereby a unitary assembly.

References Cited by the Examiner

UNITED STATES PATENTS

| | | | |
|---|---|---|---|
| 421,257 | 2/90 | Filstrup | 29—157.1 |
| 657,895 | 9/00 | Rickersberg | 29—157.1 X |
| 953,067 | 3/10 | Stark | 251—184 |
| 1,032,706 | 7/12 | Rowe | 251—184 X |
| 1,157,666 | 10/15 | Bennett | 29—525 |
| 1,529,063 | 3/25 | Gundry | 251—184 |
| 1,710,248 | 4/29 | Veeder | 251—184 |
| 1,852,651 | 4/32 | Goodall et al. | 251—309 |
| 2,387,013 | 10/45 | Fuller | 29—157.1 |
| 2,403,165 | 7/46 | Aspin | 29—157.1 X |
| 2,843,920 | 7/58 | Swartz | 29—157.1 |
| 2,869,221 | 1/59 | Siepmann | 29—157.1 |
| 2,904,877 | 9/59 | Edeler | 29—157.1 |

FOREIGN PATENTS

| | | |
|---|---|---|
| 720,597 | 12/31 | France. |
| 407,010 | 2/34 | Great Britain. |

WHITMORE A. WILTZ, *Primary Examiner.*

ISADOR WEIL, HYLAND BIZOT, *Examiners.*